US008958657B2

(12) United States Patent
Hiraki et al.

(10) Patent No.: US 8,958,657 B2
(45) Date of Patent: Feb. 17, 2015

(54) FRAME RATE CONVERSION IMAGE PROCESSING APPARATUS, CONTROL METHOD, AND COMPUTER-READABLE STORAGE MEDIUM

(75) Inventors: Yukio Hiraki, Atsugi (JP); Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/913,695

(22) Filed: Oct. 27, 2010

(65) Prior Publication Data

US 2011/0110602 A1 May 12, 2011

(30) Foreign Application Priority Data

Oct. 30, 2009 (JP) ................. 2009-250643

(51) Int. Cl.
*G06K 9/40* (2006.01)
*H04N 7/01* (2006.01)
*G09G 3/20* (2006.01)

(52) U.S. Cl.
CPC ........... *H04N 7/0132* (2013.01); *G09G 3/2022* (2013.01); *G09G 2320/0266* (2013.01); *G09G 2320/0271* (2013.01); *G09G 2320/106* (2013.01); *G09G 2340/0435* (2013.01); *G09G 2340/16* (2013.01); *G09G 2360/16* (2013.01)
USPC ............ 382/274; 382/275; 382/263; 382/264

(58) Field of Classification Search
None
See application file for complete search history.

(56) References Cited

U.S. PATENT DOCUMENTS

| | | | |
|---|---|---|---|
| 5,446,456 A * | 8/1995 | Seo ................................ 341/118 |
| 6,546,223 B2 | 4/2003 | Kishino | |
| 7,002,540 B2 | 2/2006 | Aoki | |
| 7,542,619 B2 | 6/2009 | Toyooka | |
| 7,729,563 B2 * | 6/2010 | Kameyama et al. .......... 382/299 |
| 2005/0162360 A1 * | 7/2005 | Ishihara et al. ................. 345/89 |
| 2005/0184944 A1 * | 8/2005 | Miyata et al. ................... 345/89 |
| 2006/0119617 A1 * | 6/2006 | Toyooka et al. .............. 345/619 |
| 2007/0263121 A1 * | 11/2007 | Take et al. ..................... 348/448 |
| 2008/0136752 A1 * | 6/2008 | Inoue et al. ..................... 345/77 |
| 2008/0309823 A1 * | 12/2008 | Hahn et al. .................... 348/606 |
| 2009/0122207 A1 * | 5/2009 | Inoue et al. ................... 348/739 |
| 2009/0262148 A1 * | 10/2009 | Kimura ......................... 345/690 |
| 2009/0273707 A1 * | 11/2009 | Miyoshi ....................... 348/441 |
| 2009/0303391 A1 * | 12/2009 | Jung et al. .................... 348/687 |

FOREIGN PATENT DOCUMENTS

| | | |
|---|---|---|
| CN | 1658269 A | 8/2005 |
| CN | 1798247 A | 7/2006 |
| CN | 101365052 A | 2/2009 |
| JP | 2000-030052 A | 1/2000 |

(Continued)

*Primary Examiner* — Stephen R Koziol
*Assistant Examiner* — Ryan P Potts
(74) *Attorney, Agent, or Firm* — Canon USA, Inc., IP Division

(57) ABSTRACT

An image processing apparatus that converts a frame rate by creating a sub-frame from an input frame and outputting the sub-frame, the image processing apparatus includes a generation unit configured to generate the sub-frame from the input frame, a calculation unit configured to calculate a feature amount of brightness of the input frame, and a control unit configured to perform control so as to reduce luminance of the sub-frames generated by the generation unit based on the feature amount calculated by the calculation unit.

19 Claims, 12 Drawing Sheets

(56) References Cited

FOREIGN PATENT DOCUMENTS

| | | |
|---|---|---|
| JP | 2002-023707 A | 1/2002 |
| JP | 2002-070838 A | 3/2002 |
| JP | 2006-184896 A | 7/2006 |
| JP | 2009-042481 A | 2/2009 |
| TW | I230287 B | 4/2005 |

* cited by examiner

FRAME RATE CONVERSION IMAGE PROCESSING APPARATUS, CONTROL METHOD, AND COMPUTER-READABLE STORAGE MEDIUM

BACKGROUND OF THE INVENTION

1. Field of the Invention

The present invention relates to an image processing apparatus, a control method of the image processing apparatus, and a computer-readable storage medium for performing motion image processing for converting a frame rate and, more particularly, for performing conversion processing to a higher frame rate, e.g., conversion of an image at 60 Hz into that at 120 Hz.

2. Description of the Related Art

Japanese Patent Application Laid-Open No. 2006-184896 discusses, as a conventional technique for suppressing motion blur or flicker that occurs when displaying a video image on a display device, a video display method for creating sub-frames with different frequency components from image data and alternately displaying the sub-frames at double speed. With the video display method, high frequency emphasis image data in which a high frequency component is emphasized and low frequency image data having a low frequency component, from which the high frequency component is suppressed is generated from the input image data, and the resultant image data is alternately displayed at double speed. With the technique, the flicker can be suppressed and the motion blur can also be reduced.

A sub-frame is displayed by increasing a drive frequency, like double-speed driving. Then, although the flickers are reduced, high-quality impression or high realistic sensation of a video image may be lost in some cases. The impression that video image quality is high means image quality with high picturesqueness with which gloss, color reproduction, and a sense of depth of an image, and gloss of an object and season (temperature and humidity) are sensed from a screen.

In double-speed driving for displaying two sub-frames, a ratio (distribution ratio of luminance) of a waveform strength of the two sub-frames is set within a range of 1.0:0.0 to 0.5:0.5. Therefore, when the distribution ratio is 1.0:0.0, i.e., when the distribution ratio is small, although the flickers are generated, an image with the high-quality impression is reproduced. When the distribution ratio is 0.5:0.5, i.e., when the distribution ratio is larger, although the flickers are reduced, the high-quality impression is lost.

On the other hand, Japanese Patent Application Laid-Open No. 2002-023707 or Japanese Patent Application Laid-Open No. 2002-70838 discusses that a predetermined luminance difference is provided between two sub-frames. However, depending on an average luminance value of an input frame, the flickers are consequently distinguished, and both the reduction in flickers and the image reproduction with high-quality impression are not established together.

SUMMARY OF THE INVENTION

The present invention is directed to an image processing apparatus and control method of the image processing apparatus capable of providing both the reduction in flicker and the image reproduction with high-quality impression.

According to an aspect of the present invention, an image processing apparatus that converts a frame rate by creating a sub-frame from an input frame and outputting the sub-frame, the image processing apparatus includes a generation unit configured to generate the sub-frame from the input frame, a calculation unit configured to calculate a feature amount of brightness of the input frame, and a control unit configured to perform control so as to reduce luminance of the sub-frames generated by the generation unit based on the feature amount calculated by the calculation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A configuration according to the exemplary embodiments is merely an example, and the present invention is not limited to the illustrated configuration.

Figure 1:
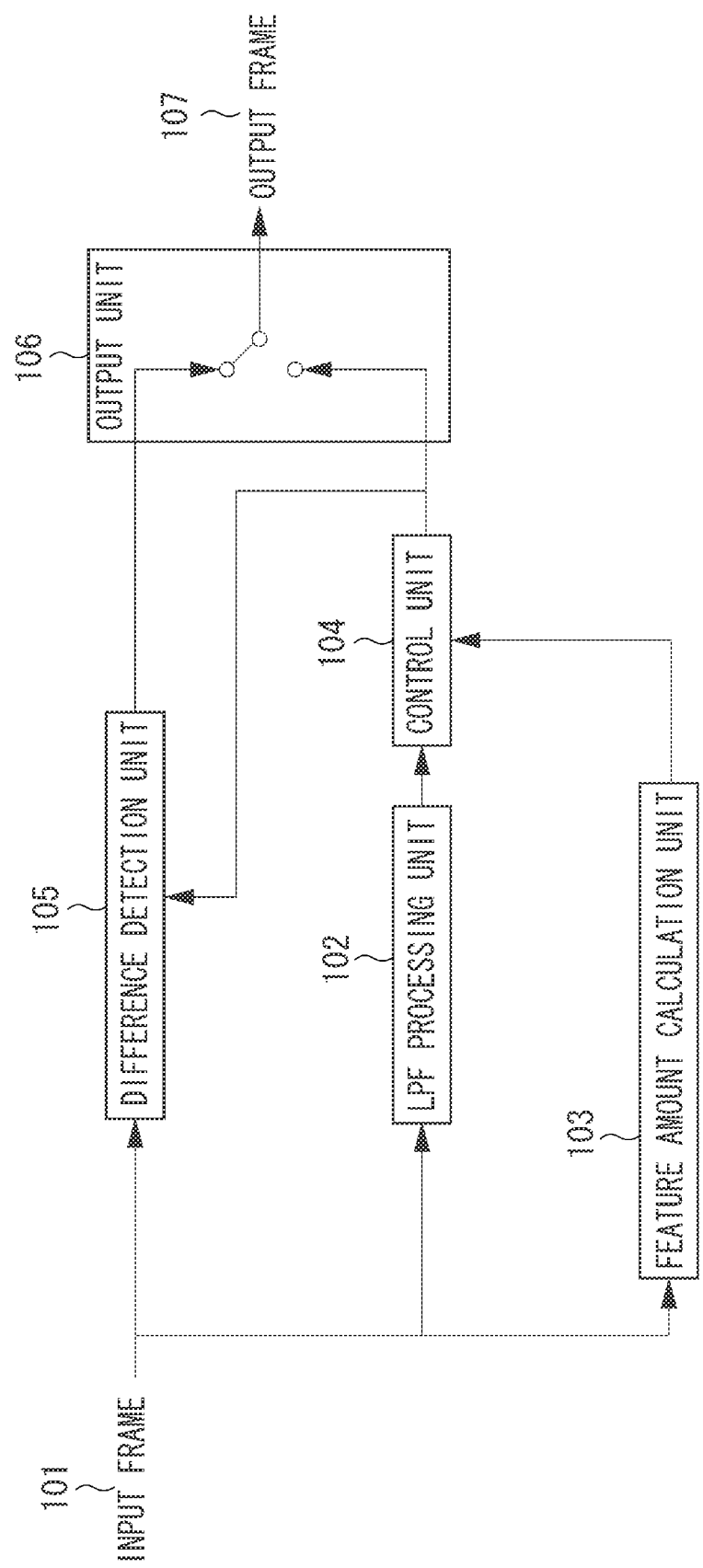
FIG. 1 illustrates an example of an image processing apparatus according to a first exemplary embodiment of the present invention.

FIG. 1 is a block diagram illustrating an example of an image processing apparatus for double-speed driving in a display device according to the first exemplary embodiment.

Referring to FIG. 1, an input frame 101 as an input image is divided into two sub-frames to generate a first sub-frame of which a high frequency component of an image is suppressed and a second sub-frame of which the high frequency component is emphasized. First of all, a creation method of the first sub-frame, of which the high frequency component is suppressed, is described.

A low-pass filter (LPF) processing unit 102 performs two-dimensional low-pass filter processing on the input frame 101. The low-pass filter particularly does not specify a function and may be a gaussian function, a moving average, or weighting moving average filter.

A feature amount calculation unit 103 calculates a feature amount of the input frame 101, further calculates an distribution ratio P (luminance distribution ratio of the first sub-frame) of the sub-frames, and outputs the calculation result to a control unit 104. The control unit 104 determines a ratio for light emission of the two sub-frames at the distribution ratio P calculated by the feature amount calculation unit 103.

The input frame 101 is subjected to the low-pass filter processing as described above, the distribution ratio is applied, and the creation of the first sub-frame is completed with suppression of the high frequency component. The sub-frames are output to an output unit 106.

Next, a creation method of the second sub-frame, in which the high frequency component is emphasized, is described. A difference detection unit 105 functions as a second sub-frame generation unit to subtract the first sub-frame from the input frame 101 and set the difference output as the second sub-frame.

When a frame is input at desired timing, i.e., at a predetermined frame rate, e.g., 60 Hz, the output unit 106 switches the two sub-frames at a period of 120 Hz, and outputs the sub-frames to a post-stage processing circuit. The output unit 106 can include a buffer circuit that temporarily stores the input sub-frames until the output timing.

In color image processing, processing is performed by dividing data into three types of image data, such as R, G, and B or Y, Cb, and Cr in many cases. A series of processing according to the present invention may be performed to the image data R, G, and B or only image data Y. Alternatively, the image data Y can be calculated from the image data R, G, and B, and the result can be applied to the image data R, G, and B.

Figure 2:
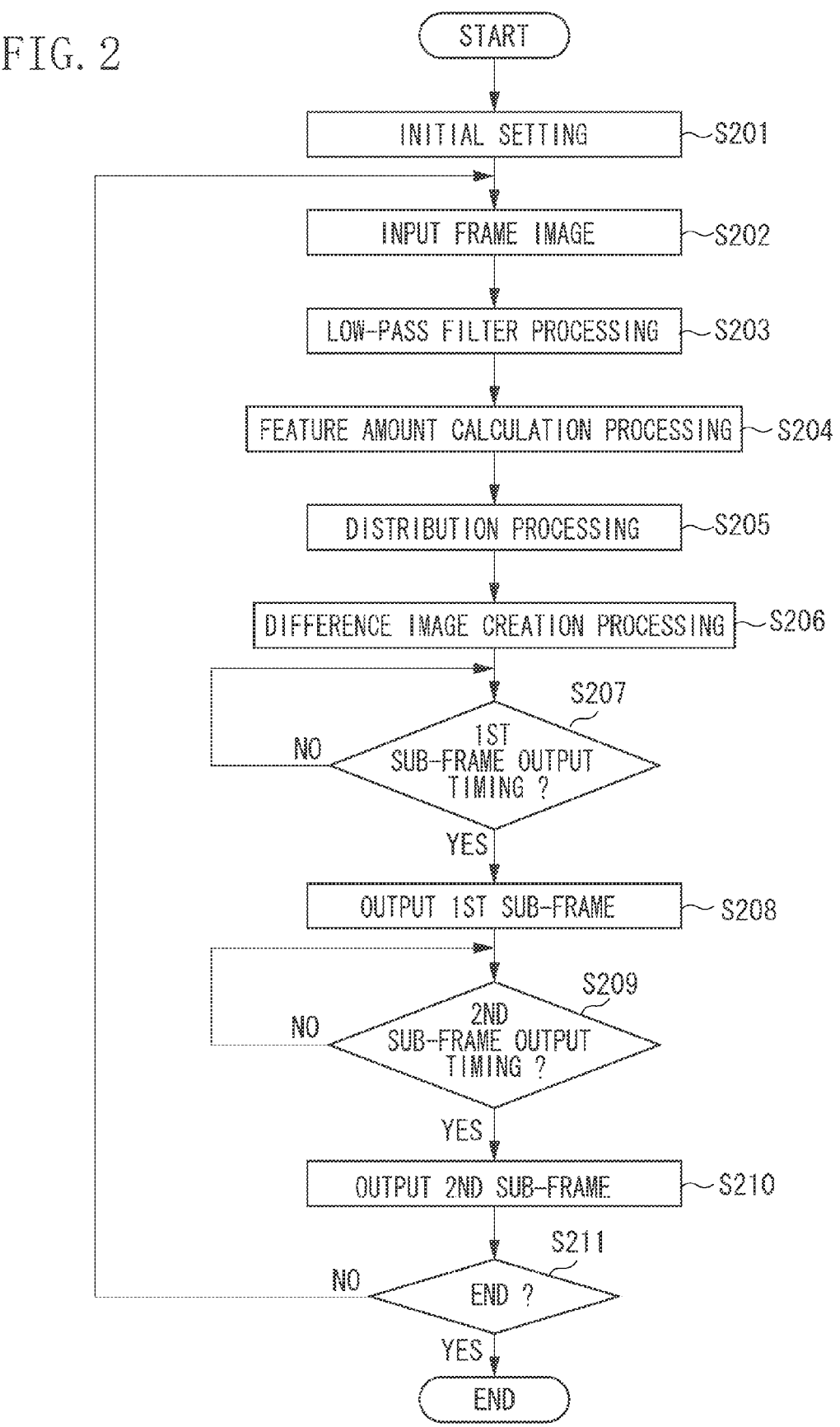
FIG. 2 illustrates a flowchart of processing according to the first exemplary embodiment.

FIG. 2 is a flowchart illustrating processing according to the present exemplary embodiment.

In step S201, necessary initial setting is executed. Here, static characteristics of the low-pass filter are set. In step S202, the input frame 101 is received. In step S203, the LPF processing unit 102 performs the low-pass filter processing on the input frame 101. With the above-described processing, the first sub-frame is generated with suppression of the high frequency component in the image.

In step S204, the feature amount calculation unit 103 calculates the feature amount of the input frame 101, and further calculates the distribution ratio of the sub-frames. As the feature amount, the amount of brightness of the image is used.

For example, a video luminance value Luma in Expression 1, a International Commission on Illumination (CIE) luminance value Y in Expression 2, Lstar brightness in Expression 3, or a sum S of product of weighted RGB signal values in Expression 4 may be used. In implementation, not floating-point operation but integer operation may be used.

$$Luma = 0.2126*R + 0.7152*G + 0.0722*B \qquad <\text{Expression 1}>$$

$$Y = 0.2126*R^{2.2} + 0.7152*G^{2.2} + 0.0722*B^{2.2} \qquad <\text{Expression 2}>$$

$$Lstar = 116*(Y/Yn)^{(1/3)} \ (Y/Yn > 0.00856)$$

$$Lstar = 116*(7.787(Y/Yn) + 16/116) - 16 \ (Y/Yn\ 0.008856) \qquad <\text{Expression 3}>$$

(where Y is a Y value in Expression 2, and Yn is a white luminance value.)

$$S = Wr*R + Wg*G + Wb*B \qquad <\text{Expression 4}>$$

(where Wr, Wg, and Wb are constants.)

Figure 3:
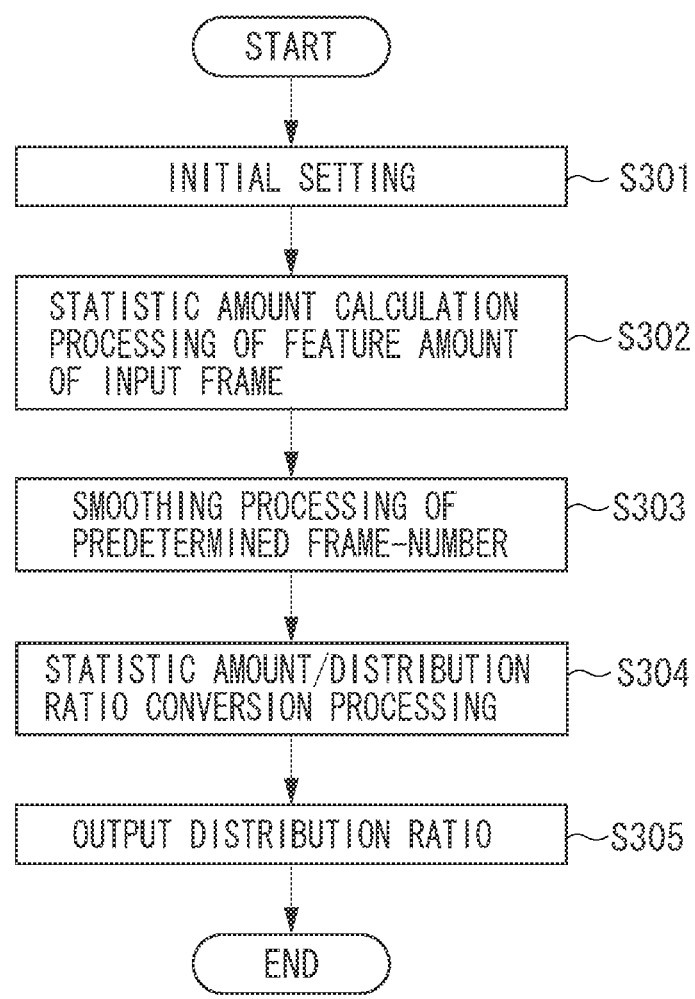
FIG. 3 illustrates a flowchart of processing of a feature amount calculation unit.

FIG. 3 illustrates processing of the feature amount calculation unit 103. In step S301, the feature amount calculation unit 103 is initialized. In step S302, the feature amount calculation unit 103 calculates the statistic amount of the whole frame of the feature amount with the above-mentioned Expressions. According to the present exemplary embodiment, as the statistic amount, an average value of the feature amounts is used. However, the statistic amount is not limited to this and may be a mode or median.

In step S303, the feature amount calculation unit 103 performs smoothing processing of a predetermined number of frames to limit the variation in feature amounts and execute stable following. In step S304, the feature amount calculation unit 103 converts the smoothed statistic amount into the distribution ratio.

In consideration of the balance between the suppression of the flickers and the image reproduction with high-quality impression, a method for converting the statistic amount into the distribution ratio requires design according to purposes. Hereinbelow, a method for converting the statistic amount into the distribution ratio is described with reference to FIGS. 4A to 4C.

Figure 4:
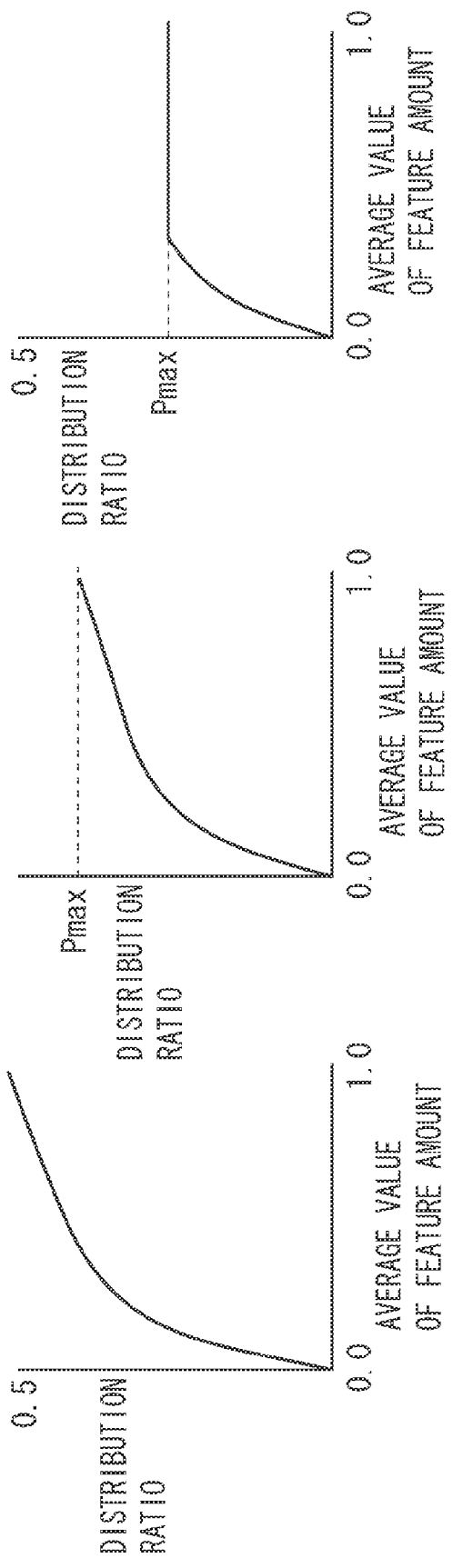
FIG. 4A illustrates a first method for converting an average value of feature amounts into an distribution ratio according to the first exemplary embodiment.
FIG. 4B illustrates a second method for converting an average value of feature amounts into an distribution ratio according to the first exemplary embodiment.
FIG. 4C illustrates a third method for converting an average value of feature amounts into an distribution ratio according to the first exemplary embodiment.

As a first method, there is a method for setting the distribution ratio with monotonic increase characteristics relative to the average value of the feature amounts. FIG. 4A illustrates an example of setting the distribution ratio with monotonic increase characteristics relative to the average value of the feature amounts.

In an area with a small average value of the feature amounts, i.e., a dark image, the distribution ratio is closer to 0.0 and the light emission of the first sub-frame in which the high frequency is suppressed is reduced. That is, the control unit 104 controls the reduction in luminance of the sub-frames output from the LPF processing unit 102 based on the feature amount calculated by the feature amount calculation unit 103.

Thus, the output image has an image quality at 60 Hz, the flickers are reduced in an area with small luminance, and an image with high-quality impression is displayed at 60 Hz.

In an area with the average value of the feature amounts closer to 1.0, i.e., a bright image, the distribution ratio is close to 0.5 as the maximum level, light is emitted with approximately the identical luminance in the first sub-frame with suppression of the high frequency component and the second sub-frame with emphasis of the high frequency component. As a consequence, the output image is driven at 120 Hz, and an image with high-quality impression is not reproduced, however, flickers to be strong interference are reduced.

When the average value of the feature amounts is in the intermediate area, the difference in luminance between the first sub-frame and the second sub-frame suppresses the generation of the flickers, and an image with high-quality impression can be reproduced. A one-dimensional look-up table realizes the configuration.

As a second method, there is a method for setting the distribution ratio with monotonic increase characteristics having a maximum value thereof relative to the average value of the feature amounts. FIG. 4B illustrates an example of setting the distribution ratio with monotonic increase characteristics having a maximum value Pmax thereof relative to the average value of the feature amounts. As the first method, the maximum Pmax of the distribution ratio is 0.5 with which light is emitted with the same luminance in the first sub-frame and the second sub-frame. However, when the distribution ratio is close to 0.5, an image with high-quality impression is not reproduced.

As a consequence, the distribution ratio is limited to the limit value Pmax smaller than 0.5 within the range of the distribution ratio, the interference of the flickers is permitted to some degree, and an image with high-quality impression can be reproduced. Similar to the first method, the one-dimensional look-up table realizes the second method.

As a third method, the distribution ratio is set with the monotonic increase characteristics relative to the average value of the feature amounts until the distribution ratio reaches the set maximum value. Further, when the distribution ratio reaches the maximum value, the distribution ratio is set to constantly be the maximum value. FIG. 4C illustrates an example in which the distribution ratio is set with the monotonic increase characteristics having the maximum value Pmax thereof relative to the average value of the feature amounts, and is further set to constantly be a limit value Pmax when the distribution ratio reaches the maximum value Pmax. This is suitable to the case of focusing on the image reproduction with high-quality impression. Similar to the first and second methods, the one-dimensional look-up table realizes the third method.

The example of performing the methods for converting the statistic amount into the distribution ratio with the feature amount calculation unit 103, is described. The control unit 104 may perform the conversion methods. In this case, the feature amount calculation unit 103 outputs the calculated feature amount to the control unit 104.

Returning to the flowchart in FIG. 2, in step S205, the control unit 104 performs distribution processing of the sub-frames subjected to the low-pass filter processing by the LPF processing unit 102 with the distribution ratio determined in step S204. That is, the control unit 104 controls the reduction of the luminance of the sub-frames output from the LPF processing unit 102 based on the feature amount calculated by the feature amount calculation unit 103.

In step S206, the difference detection unit 105 calculates the second sub-frame as a difference image obtained by subtracting the first sub-frame from the input frame 101.

In step S207, the output unit 106 determines the output timing of the first sub-frame. When the output timing is that of the first sub-frame (YES in step S207), the processing proceeds to step S208. In step S208, the output unit 106 outputs the first sub-frame. The first sub-frame is temporarily stored in a frame memory or a buffer in the output unit 106, and is output as an output frame 107 from the output unit 106 at the output timing.

After outputting the first sub-frame, in step S209, the output timing of the second sub-frame is determined. When the output timing is the second sub-frame (YES in step S209), in step S210, the output unit 106 outputs the second sub-frame. The second sub-frame may be temporarily stored in the buffer in the output unit 106, and is output as the output frame 107 at the output timing from the output unit 106.

When the processing for all frames ends (YES in step S211), the present processing ends. When the processing for all frames does not end (NO in step S211), the processing returns to step S202 and is repeated.

The output sequence of the sub-frames described with reference to the flowchart in FIG. 2 is merely an example, and the present invention is not limited to this. After outputting the second sub-frame, the first sub-frame may be output.

After creating the two sub-frames, the output timing is determined. However, the present exemplary embodiment is not limited to this. When the low-pass filter processing ends in step S204, the output timing of the first sub-frame is determined, and the first sub-frame is output, and then difference value detection processing may be performed to generate the second sub-frame.

Figure 5:
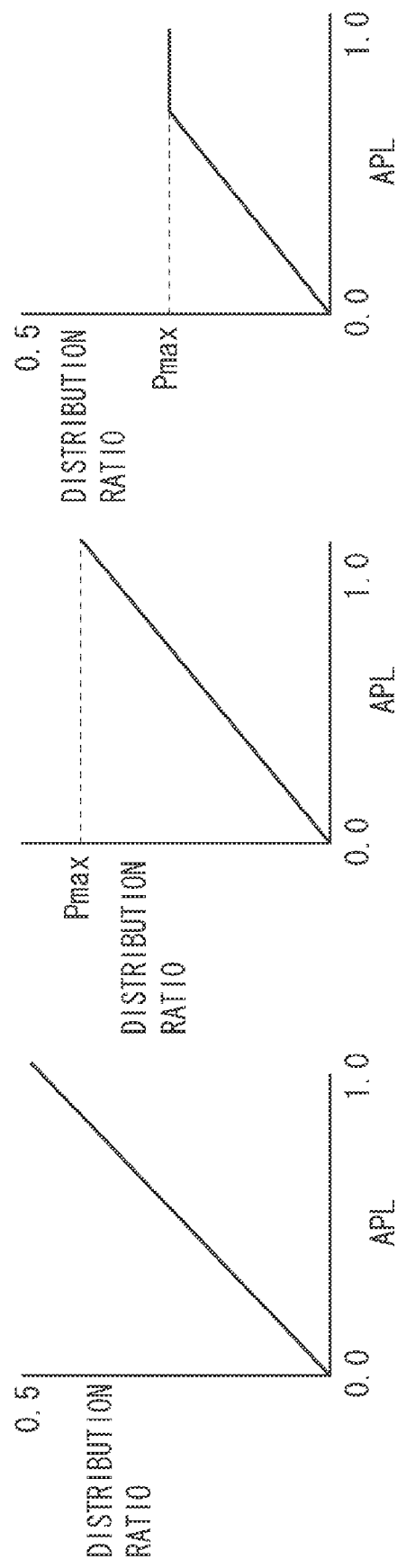
FIG. 5A illustrates a first method for converting an average picture level (APL) into an distribution ratio according to the first exemplary embodiment.
FIG. 5B illustrates a second method for converting the APL into an distribution ratio according to the first exemplary embodiment.
FIG. 5C illustrates a third method for converting the APL into an distribution ratio according to the first exemplary embodiment.

According to a modification of the first exemplary embodiment, a case where the luminance Luma in Expression 1 is used as the feature amount, corresponding to integer data, to reduce the circuit scale of the feature amount calculation unit 103 in FIG. 1, is described with reference to FIGS. 5A to 5C. The luminance Luma is used as the feature amount, and an average picture level (APL) of the luminance Luma is used as the statistic amount.

As a first method thereof, there is a method for setting the distribution ratio with monotonic increase characteristics to the APL. FIG. 5A illustrates an example in which the distribution ratio is set with the monotonic increase characteristics relative to the APL and the distribution ratio is a linear function of the APL.

In an area with a small APL, i.e., a dark area, the distribution ratio is close to 0.0, and light emission is reduced on the first sub-frame. As a consequence, an output image has an image quality driven at 60 Hz, in an area with small luminance, the flickers are reduced, and an image with the high-quality impression is displayed by driving at 60 Hz.

In an area with the APL close to 1.0, i.e., a bright image, the distribution ratio is close to 0.5, light is emitted with approximately identical luminance in the first sub-frame with suppression of the high frequency component and the second sub-frame with emphasis of the high frequency component. Although an output image is driven at 120 Hz and thus the image is not reproduced with the high-quality impression, flickers resulting in strong interference are reduced.

When the APL is in an intermediate area, the occurrence of flickers is suppressed by the difference in luminance between the first sub-frame and the second sub-frame, and an image with the high-quality impression can be reproduced. With the configuration, the distribution ratio has an inclination of the linear function. Therefore, with a higher-order bit of the APL value, the first method can be easily realized.

As a second method, the distribution ratio is set with monotonic increase characteristics having a maximum value thereof relative to the APL. FIG. 5B illustrates an example of a linear function with the setting of the distribution ratio relative to the APL with a maximum value Pmax of the distribution ratio. With the first method, the distribution ratio is 0.5 at which light is emitted with the same luminance in the first sub-frame and the second sub-frame. However, an image with the high-quality impression is not reproduced.

Thus, the distribution ratio is up to Pmax smaller than 0.5, the interference due to the flickers is allowed to some degree, and an image can be reproduced with the high-quality impression. As an example, Pmax can be set to 0.4. With the configuration, the distribution ratio has an inclination of a linear function. By using shift operation and addition operation of the APL, this can be simply realized.

As a third method, the distribution ratio is set with the monotonic increase characteristics relative to the APL until the distribution ratio reaches the maximum value. When the distribution ratio reaches the maximum value, the distribution ratio is set to constantly be the maximum value thereof. FIG. 5C illustrates an example in which the distribution ratio is set with the monotonic increase characteristics relative to the APL until the distribution ratio reaches the set maximum value, and the distribution ratio is set to constantly be the maximum value when the distribution ratio reaches the maximum value. The example is suitable for characteristics when focusing on the image reproduction with the high-quality impression. With the configuration, the distribution ratio has an inclination of the linear function, and the third method can be easily realized by using a shift operation and an addition operation of the APL.

According to the second exemplary embodiment, the configuration formed by adding a minimum value filter unit 601 to that according to the first exemplary embodiment is described below. With the configuration, not only both the reduction in flickers and the image reproduction with the high-quality impression are established but also the blur of the motion image is reduced. The blur of the motion image is described below.

Figure 11:
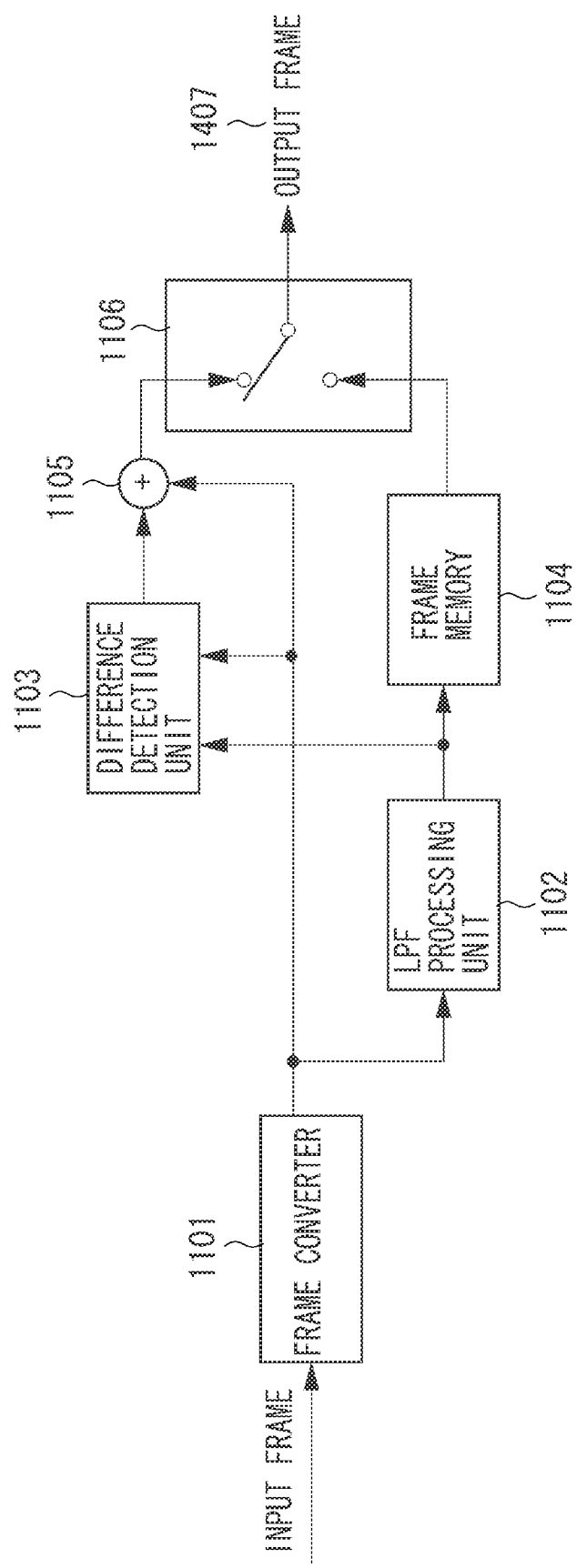
FIG. 11 illustrates a conventional circuit configuration.
Figure 12:
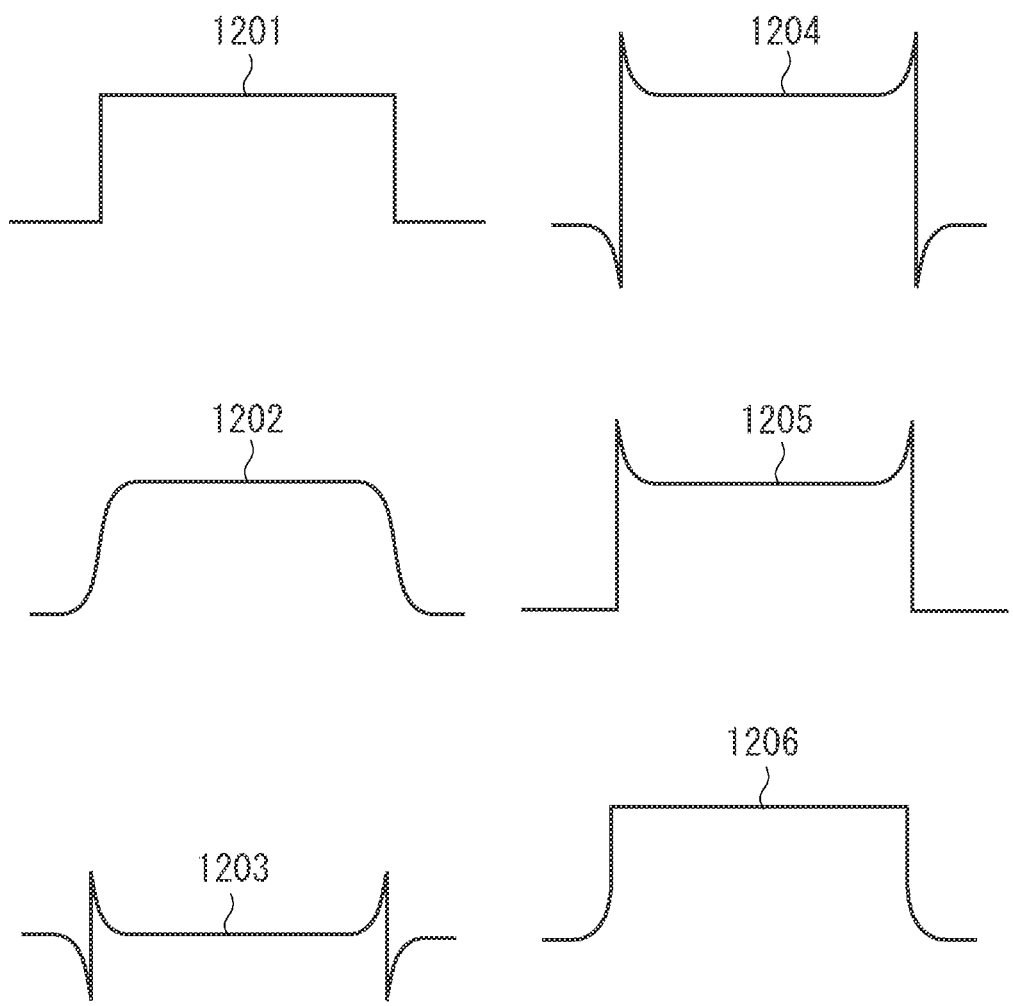
FIG. 12 illustrates an example of a waveform of a frame image output from a double-speed driving circuit illustrated in FIG. 11.

FIG. 12 illustrates an example of a waveform of a frame image output from a double-speed driving circuit illustrated in FIG. 11. A waveform 1201 illustrates an example of the waveform of the input frame. A waveform 1202 is an output waveform obtained by low-pass filter processing of the waveform 1201 of the input frame by an LPF processing unit 1102 in FIG. 11. A waveform 1203 is an output waveform obtained by difference detection by a difference detection unit 1103 in FIG. 11. Since the waveform 1203 has the high frequency component, the waveform 1203 has a positive/negative value. A waveform 1204 is obtained by adding the waveform 1203 with the high frequency component to the waveform 1201 of the original input frame.

Theoretically, the waveform 1202 and the waveform 1204 are alternately displayed at a period of 120 Hz, thereby setting an apparent waveform to be similar to the waveform 1201. However, when a low luminance level portion of the waveform 1201 is zero or close to zero, the waveform 1204 has a negative value.

Since an image with a negative value cannot be displayed, the negative value is actually displayed as zero like the waveform 1205. Then, an apparent combination waveform alternately displays the waveform 1202 and the waveform 1205. Therefore, the apparent combination waveform becomes like the waveform 1206. When a black background includes a white character, a character contour is perceived as a blurring image. Depending on the waveform of the input image, there is a problem that an image after the distribution processing is not viewed to be similar to the original image, and is perceived as deterioration.

According to the present exemplary embodiment, a case in which both the reduction in flickers and the image reproduction with the high-quality impression are established, in addition, and the blur of the motion image can be reduced, is described.

Figure 6:
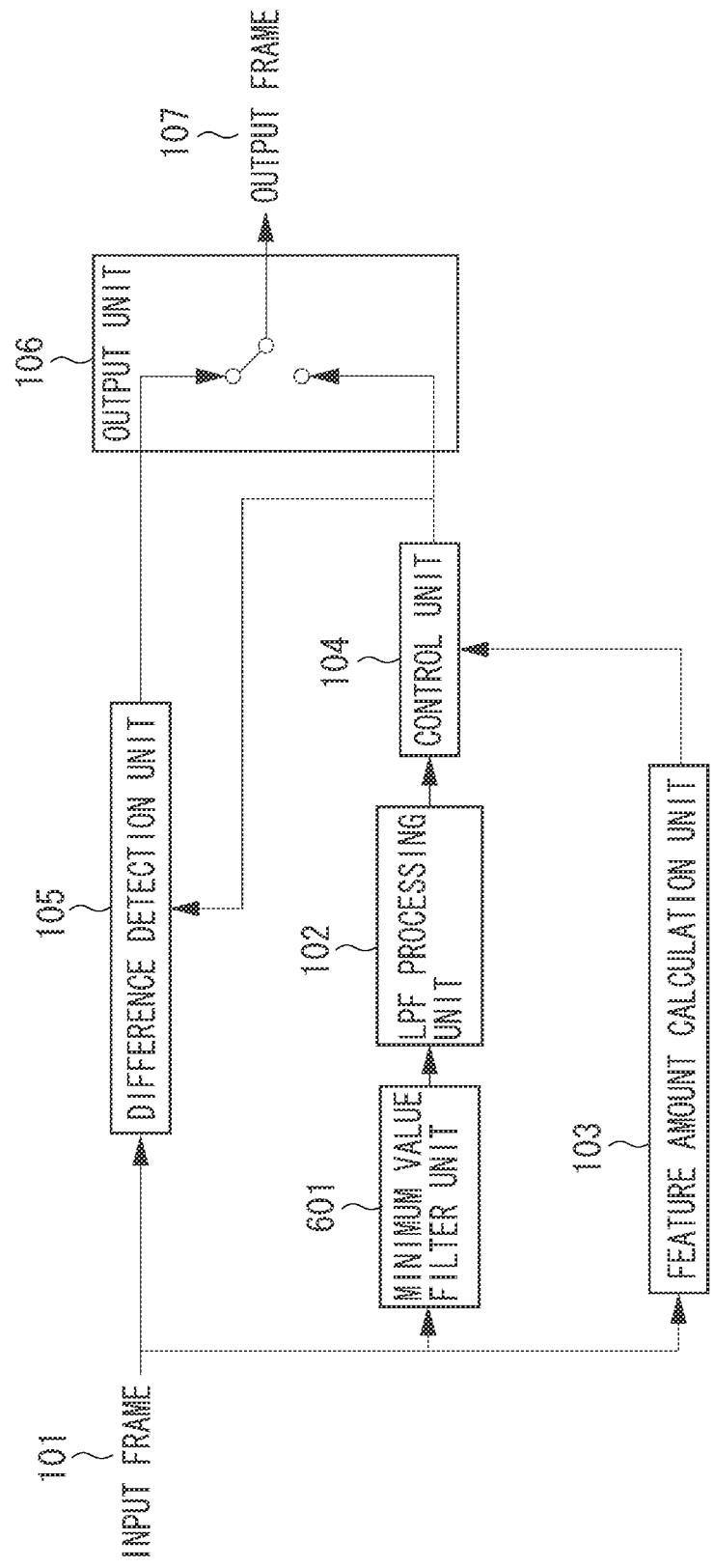
FIG. 6 illustrates an example of an image processing apparatus according to a second exemplary embodiment of the present invention.

FIG. 6 illustrates an example of an image processing apparatus for double-speed driving in a display device according to the second exemplary embodiment. Components in the image processing apparatus similar to those of the first exemplary embodiment are not described, and a characteristic configuration is described below according to the present exemplary embodiment.

The minimum value filter unit 601 performs the minimum value filter processing for selecting the minimum value of the pixels in the block as pre-processing of the low-pass filter processing by the LPF processing unit 102. In the processing, a block with a predetermined filter size (e.g., 9×9) is set to a processing target pixel of the input frame 101. One of neighboring pixels of the processing target pixel in the block with the minimum pixel value is selected, and is replaced with the pixel value of the processing target pixel.

The minimum value filter expands the minimum value of the filter size to all pixels within the filter size. The area expansion filter is not limited by the minimum value. When the minimum value of the filter size is extremely small, since the pixel may include noise, therefore the pixel value is not selected, and processing in which the second smallest value is selected and is expanded to all pixels in the filter size may be performed.

Figure 7:
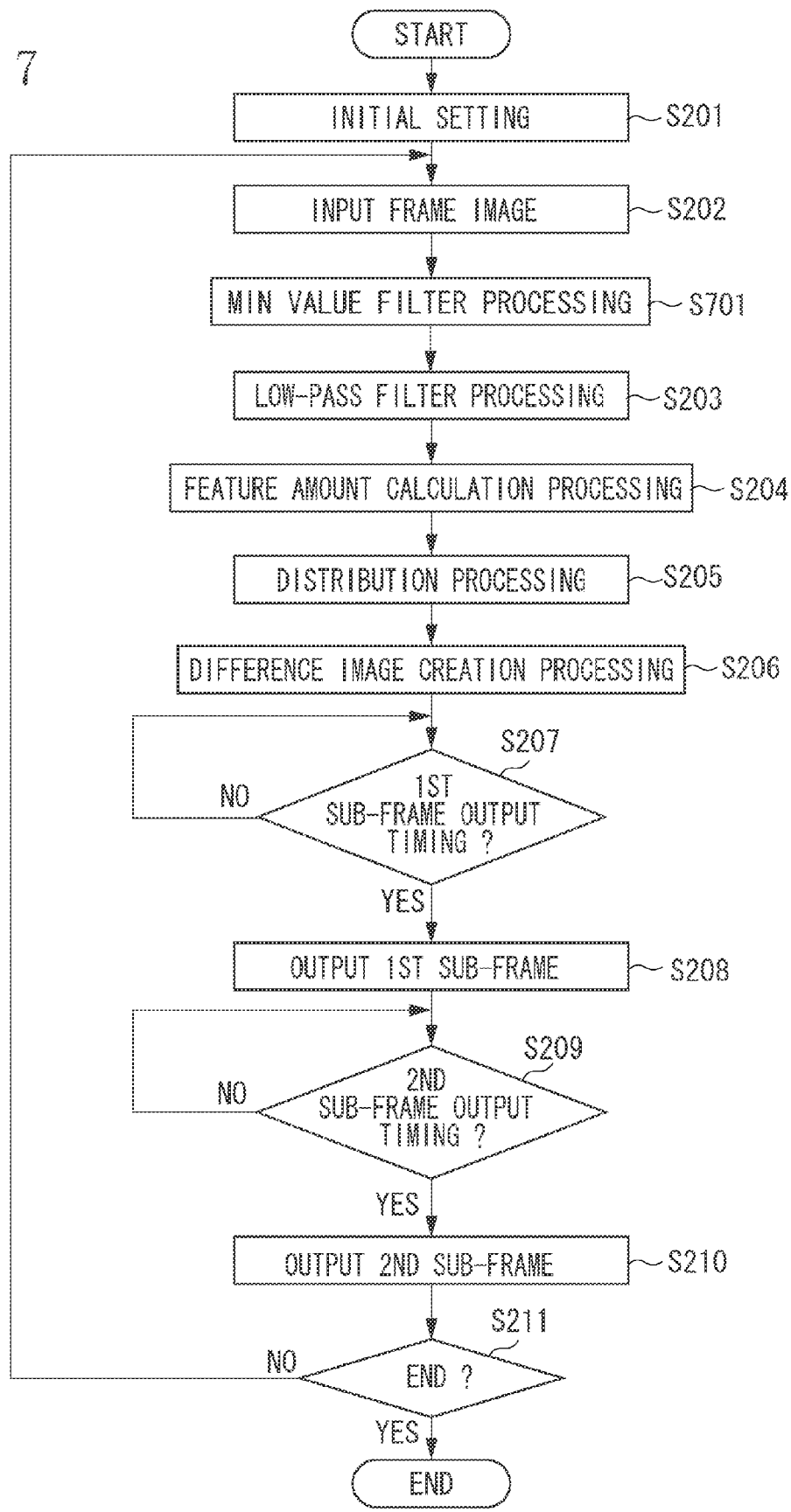
FIG. 7 illustrates a flowchart of processing according to the second exemplary embodiment.

FIG. 7 is a flowchart illustrating processing according to the present exemplary embodiment. In step S701, the minimum value filter unit 601 performs the minimum value filter processing of the input frame. The processing overlapped to the first exemplary embodiment is not described.

Figure 8:
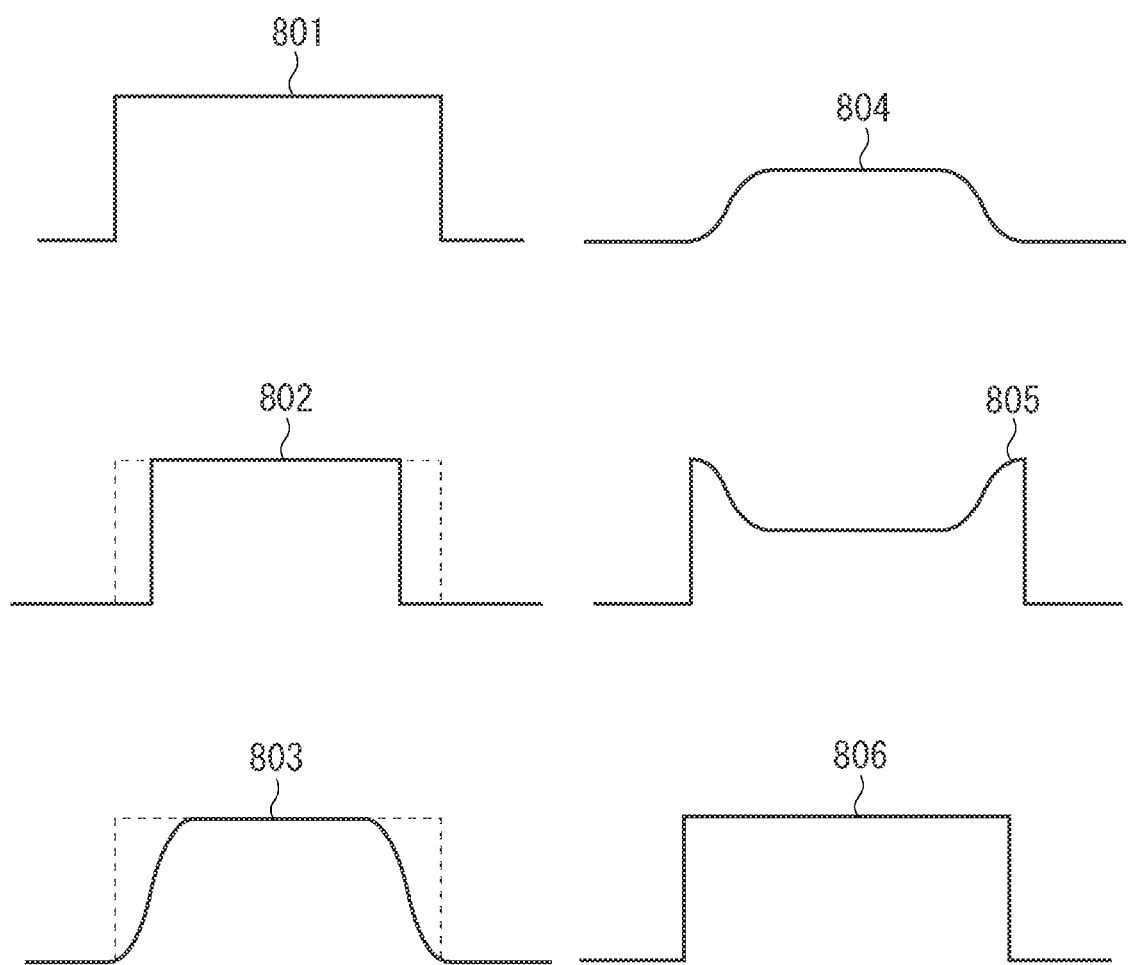
FIG. 8 illustrates a processing waveform according to the second exemplary embodiment.

Referring to FIG. 8, a waveform 801 illustrates an example of the input waveform. A waveform 802 is obtained by performing minimum value filter processing on the input waveform 801 by the minimum value filter unit 601. In the input frame 801, at the border at which the pixel value with high luminance is adjacent to the pixel value with low luminance, the pixel value with low luminance is selected. The edge border is consequently narrowed to the inside of a high luminance area, as illustrated by the waveform 802.

A waveform 803 is obtained by performing low-pass filter processing on the waveform 802. A waveform 804 is obtained by multiplying the distribution ratio calculated by the control unit 104 to the waveform 803, and is also the first sub-frame obtained by suppressing the high frequency component. The waveform 805 is a second sub-frame output from the difference detection unit 105.

When the first sub-frame with the waveform 804 in FIG. 8 and the second sub-frame with the waveform 805 are alternately displayed at high speed, the sub-frames are seen visually like a waveform 806. Thus, the sub-frames are perceived as the same waveform as the waveform 801 of the input frame 101 displayed at 60 Hz. Color image processing is similar to that.

According to the present exemplary embodiment, not only both the reduction in flickers and the image reproduction with high-quality impression are established but also the blur of the motion image is reduced.

According to the first exemplary embodiment, in the device that displays the sub-frames from which the frequency component is separated, both the reduction in flickers and the image reproduction with the high-quality impression can be established. The present invention can be also applied to a method for creating the intermediate sub-frames. Hereinbelow, the method is described with reference to FIG. 9.

Figure 9:
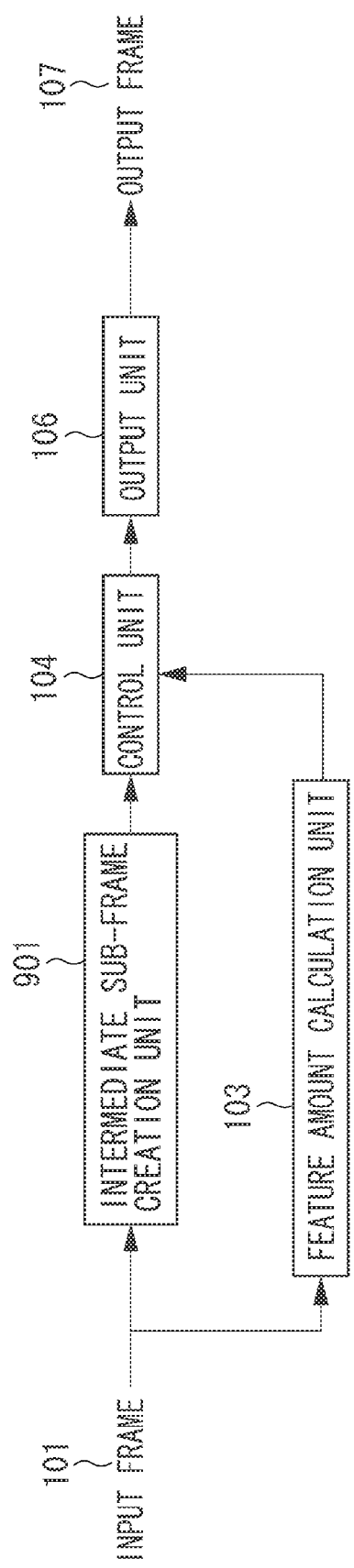
FIG. 9 illustrates an example of an image processing apparatus according to a third exemplary embodiment of the present invention.

Referring to FIG. 9, the input frame 101 indicates an input image, i.e., an original image that is externally input, and has a frame frequency of a signal at 60 Hz. The signal is stored onto a frame memory (not illustrated), if necessary, and is input to an intermediate sub-frame generation unit 901.

The intermediate sub-frame generation unit 901 generates a plurality of intermediate sub-frames from the input frame 101. A suitable method for creating the intermediate sub-frames may be used if necessary, e.g., iteration of the input frame, interpolation from front and back frames, and passage of the low frequency component of the input frame. The generated intermediate sub-frames are transmitted to a control unit 104.

The control unit 104 multiplies the distribution ratio calculated by the feature amount calculation unit 105 to the intermediate sub-frames, similar to the first exemplary embodiment. The details of the feature amount calculation unit 105 are similar to those of the first exemplary embodiment, and therefore are not described. The above-generated sub-frames are stored onto a frame memory (not illustrated), and are output to the output unit 106.

The output unit 106 switches two sub-frames, and outputs the sub-frames to a processing circuit of the latter stage as output frames at desired timing, e.g., at a period of 120 Hz in the case of an input frame at 60 Hz.

Obviously, the period is not limited to 120 Hz, and the driving is possible at a higher frequency. When the input frame at 60 Hz is output at 240 Hz, one input frame is subjected to division processing into 4 sub-frames. The distribution ratio to the four sub-frames in this case is determined depending on the balance between the flickers and the image reproduction with the high-quality impression. Preferably, the distribution ratio is 1:0:0:0 when the feature amount is small, and is 0.25:0.25:0.25:0.25 when the feature amount is large.

With the configuration according to the present exemplary embodiment, both the reduction in flickers and the image reproduction with the high-quality impression can be also established.

The units included in the apparatus illustrated in FIGS. 1, 6, and 9 are all formed with hardware according to the exemplary embodiments. However, the units may be formed with a computer program. In this case, a computer including a memory for storing the computer program and a CPU for executing the computer program stored in the memory can be applied to an image processing apparatus according to the exemplary embodiments.

Figure 10:
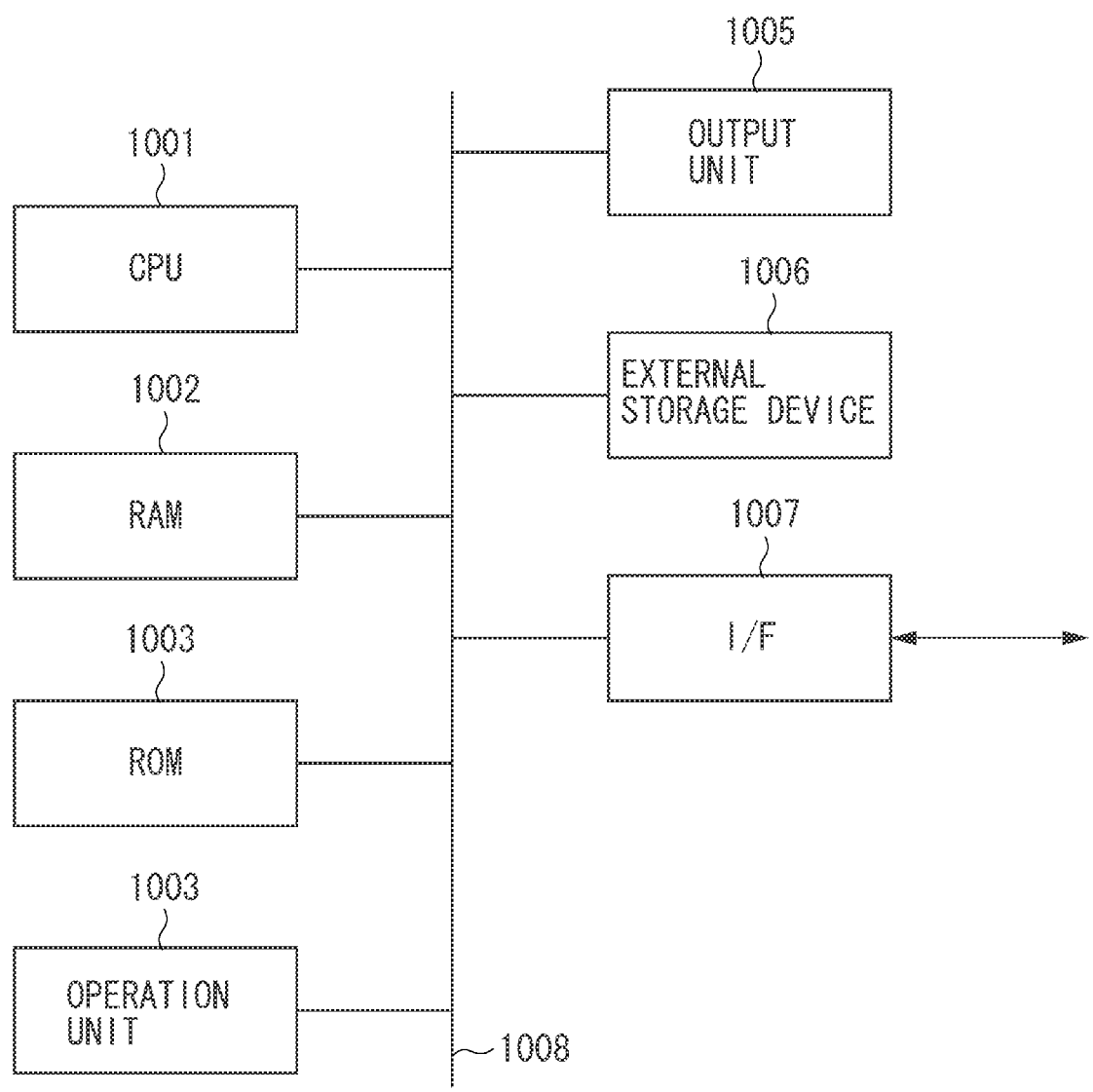
FIG. 10 illustrates an example of a hardware configuration of the image processing apparatus according to the exemplary embodiments.

FIG. 10 is a block diagram illustrating an example of a hardware structure of a computer that can be applied to an image processing apparatus according to the exemplary embodiments.

A CPU 1001 controls the entire computer using a computer program or data stored in a RAM 1002 or a ROM 1003, and executes the processing that is performed by the image processing apparatus according to the exemplary embodiments. That is, the CPU 1001 functions as the units 102 to 106 in FIGS. 1, 6, and 9, or the unit 601 in FIG. 6 or unit 901 in FIG. 9.

The RAM 1002 includes an area for temporarily storing the computer program or data loaded from an external storage device 1006 or data externally-obtained via an interface (I/F) 1009. Further, the RAM 1002 includes a work area used for executing various processing by the CPU 1001. That is, the RAM 1002 is allocated as a frame memory or can properly provide other areas.

The ROM 1003 stores data for setting the computer or a boot program. An operation unit 1004 includes a keyboard and a mouse, and is operated by a user of the computer to input various instructions to the CPU 1001.

The display unit 1005 displays a processing result of the CPU 1001. The display unit 1005 includes a holding type display device such as a liquid crystal display or an impulse-type display device such as a field-emission type display device.

The external storage device 1006 is a large-capacity information storage device, typically, e.g., a hard disk drive. The external storage device 1006 stores an OS (operating system) or a computer program for enabling the CPU 1001 to realize functions of the units in FIGS. 1, 6, and 9 and the flows in FIGS. 2, 3, and 7. Further, the external storage device 1006 may store image data as a processing target.

The computer program or data stored in the external storage device 1006 is loaded to the RAM 1002 under control of the CPU 1001, and becomes a processing target of the CPU 1001.

A network such as LAN or Internet or another device can be connected to an interface (I/F) 1007. The computer can obtain or transmit various information via the I/F 1007. A bus 1008 connects the units.

The CPU 1001 mainly performs the operation of the flowchart.

The present invention can be applied to a system including a plurality of apparatuses (e.g., a host computer, an interface device, a reader, and a printer) or a single apparatus (e.g., a copying machine or a facsimile machine).

The object of the present invention is accomplished by supplying a storage medium storing a code of a computer program for realizing the function to a system and reading and executing a code of a computer program by the system. In this case, the code of the computer program read from the storage medium realizes the functions according to the exemplary embodiments, and the present invention is configured by the storage medium that stores the code of the computer program. An operating system (OS) operated on the computer performing a part or all of actual processing based on an instruction of the code of the program, and enabling the functions by the above processing are included in the present invention.

Further, the present invention can be realized by the following method. That is, a computer program code read from a storage medium is written to a memory included in a functional expansion card inserted to the computer or a functional expansion unit connected to the computer. A CPU included in the functional expansion card or functional expansion unit performs a part or all of actual processing based on an instruction of a code of the computer program to realize the functions.

When the present invention is applied to the storage medium, the storage medium stores a code of a computer program corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-250643 filed Oct. 30, 2009, which is hereby incorporated by reference herein in its entirety.

What is claimed is:

1. An image processing apparatus comprising:
a first generation unit configured to receive an input frame having an image and configured to generate an intermediate sub-frame from the input frame by performing filter processing on the input frame;
a calculation unit configured to calculate a feature amount of brightness of the input frame;
a determination unit configured to determine a distribution ratio of luminance for a plurality of display frames to be displayed and correspond to the input frame;
a second generation unit configured to generate a first display sub-frame as one of the plurality of display frames by using the distribution ratio determined by the determination unit and the intermediate sub-frame generated by the first generation unit; and
an output unit configured to output, as the plurality of display frames, the first display sub-frame and at least one of the input frame and a second display sub-frame which is based on a difference between the input frame and the first display sub-frame,
wherein the determination unit determines the distribution ratio for the plurality of display frames based on the feature amount of brightness of the input frame calculated by the calculation unit such that a first distribution ratio, not more than 0.5, for the first display sub-frame is higher, and a second distribution ratio, not less than 0.5, for other display frames of the plurality of display frames is lower, in a case where each of pixel values of the entire input frame corresponds to a highest luminance than in a case where each of the pixel values of the entire input frame corresponds to a lowest luminance, and wherein at least the first generation unit, the calculation unit, the determination unit, the second generation unit, and the output unit are implemented by a central processing unit in the image processing apparatus.

2. The image processing apparatus according to claim 1, wherein the first generation unit generates the intermediate sub-frame by suppressing a high frequency component of the input frame, the image processing apparatus further comprising a second generation unit configured to generate the second display sub-frame that emphasizes the high frequency component of the input frame by subtracting the first display sub-frame from the input frame.

3. The image processing apparatus according to claim 2, further comprising a minimum value filter unit configured to replace a pixel value of a pixel included in the input frame with a minimum pixel value of neighboring pixels of the pixel included in the input frame, wherein the first generation unit generates the intermediate sub-frame by performing filter processing of the input frame processed by the minimum value filter unit.

4. The image processing apparatus according to claim 2, wherein the output unit is configured to alternately switch output of the first display sub-frame and the second display sub-frame as the plurality of display frames.

5. The image processing apparatus according to claim 1, wherein the calculation unit calculates, as a feature amount of brightness of the input frame, at least one of statistic amounts of a video luminance value, a Commission on Illumination (CIE) luminance value, and Lstar brightness, and a sum of product of weighted red-green-blue (RGB) signal values of the input frame.

6. The image processing apparatus according to claim 1, wherein the determination unit determines a ratio for light emission of the first and second display frames at the distribution ratio by multiplying the distribution ratio to the first and second sub-frames, and performs control to reduce luminance of the intermediate sub-frame.

7. The image processing apparatus according to claim 6, wherein the distribution ratio is set with monotonic increase characteristics relative to an average value of feature amounts of brightness calculated by the calculation unit.

8. The image processing apparatus according to claim 6, wherein the distribution ratio is set with monotonic increase characteristics having a predetermined maximum value thereof relative to an average value of feature amounts of brightness calculated by the calculation unit.

9. The image processing apparatus according to claim 6, wherein the distribution ratio is set with monotonic increase characteristics having a predetermined maximum value thereof relative to an average value of feature amounts of brightness calculated by the calculation unit and takes on the predetermined maximum value as a constant value after the distribution ratio reaches the predetermined maximum value.

10. The image processing apparatus according to claim 1, wherein the output unit is configured to alternately output the input frame and the first display sub-frame.

11. The apparatus according to claim 1, wherein the determination unit determines the first and second distribution ratios based on feature amounts of brightness calculated from a plurality of input frames such that the first distribution ratio for the first display sub-frame is higher, and the second distribution ratio for other display frames of the plurality of display frames is lower, in a case where each of pixel values of the plurality of entire input frames corresponds to the highest luminance than in a case where each of pixel values of the plurality of entire input frames does not correspond to the highest luminance.

12. A control method for an image processing apparatus, the control method comprising:

receiving an input frame having an image and first generating an intermediate sub-frame from the input frame by performing filter processing on the input frame;

calculating a feature amount of brightness of the input frame as the calculated feature amount of brightness of the input frame;

determining a distribution ratio of luminance for a plurality of display frames to be displayed and correspond to the input frame;

second generating a first display sub-frame as one of the plurality of display frames by using the determined distribution ratio and the generated intermediate sub-frame; and outputting, as the plurality of display frames, the first display sub-frame and at least one of the input frame and a second display sub-frame which is based on a difference between the input frame and the first display sub-frame, wherein determining includes determining the distribution ratio for the plurality of display frames based on the calculated feature amount of brightness of the input frame such that a first distribution ratio, not more than 0.5, for the first display sub-frame is higher, and a second distribution ratio, not less than 0.5, for other display frames of the plurality of display frames is lower, in a case where each of pixel values of the entire input frame corresponds to a highest luminance than in a case where each of the pixel values of the entire input frame corresponds to a lowest luminance.

13. The control method according to claim 12, wherein first generating includes generating the intermediate sub-frame by suppressing a high frequency component of the input frame, the control method further comprising third generating the second display sub-frame that emphasizes the high frequency component of the input frame by subtracting the first display sub-frame from the input frame.

14. The control method according to claim 13, wherein outputting includes alternately switching output of the first display sub-frame and the second display sub-frame as the plurality of display frames.

15. The control method according to claim 12, wherein determining includes determining the first and second distribution ratios based on feature amounts of brightness calculated from a plurality of input frames such that the first distribution ratio for the first display sub-frame is higher, and the second distribution ratio for other display frames of the plurality of display frames is lower, in a case where each of pixel values of the plurality of entire input frames corresponds to the highest luminance than in a case where each of pixel values of the plurality of entire input frames does not correspond to the highest luminance.

16. A non-transitory computer-readable storage medium storing a program to cause an image processing apparatus to perform a control method, the control method comprising:

receiving an input frame having an image and first generating an intermediate sub-frame from the input frame by performing filter processing on the input frame;

calculating a feature amount of brightness of the input frame as the calculated feature amount of brightness of the input frame;

determining a distribution ratio of luminance for a plurality of display frames to be displayed and correspond to the input frame;

second generating a first display sub-frame as one of the plurality of display frames by using the determined distribution ratio and the generated intermediate sub-frame; and outputting, as the plurality of display frames, the first display sub-frame and at least one of the input frame and a second display sub-frame which is based on a difference between the input frame and the first display sub-frame, wherein determining includes determining the distribution ratio for the plurality of display frames based on the calculated feature amount of brightness of the input frame such that a first distribution ratio, not more than 0.5, for the first display sub-frame is higher, and a second distribution ratio, not less than 0.5, for other display frames of the plurality of display frames is lower, in a case where each of pixel values of the entire input frame corresponds to a highest luminance than in a case where each of the pixel values of the entire input frame corresponds to a lowest luminance.

17. The non-transitory computer-readable storage medium according to claim 16, wherein first generating includes generating the intermediate sub-frame by suppressing a high frequency component of the input frame, the non-transitory computer-readable storage medium further comprising third generating the second display sub-frame that emphasizes the high frequency component of the input frame by subtracting the first display sub-frame from the input frame.

18. The non-transitory computer-readable storage medium according to claim 17, wherein outputting includes alternately switching output of the first display sub-frame and the second display sub-frame as the plurality of display frames.

19. The non-transitory computer-readable storage medium according to claim 16, wherein determining includes determining the first and second distribution ratios based on feature amounts of brightness calculated from a plurality of input frames such that the first distribution ratio for the first display sub-frame is higher, and the second distribution ratio for other display frames of the plurality of display frames is lower, in a case where each of pixel values of the plurality of entire input frames corresponds to the highest luminance than in a case where each of pixel values of the plurality of entire input frames does not correspond to the highest luminance.

* * * * *